US012014085B2

(12) United States Patent
Moghe et al.

(10) Patent No.: US 12,014,085 B2
(45) Date of Patent: Jun. 18, 2024

(54) UNIFIED NAMESPACE ACROSS DATA ACCESS PROTOCOLS

(71) Applicant: Nutanix, Inc., San Jose, CA (US)

(72) Inventors: Dheer Moghe, Bangalore (IN); Karan Gupta, San Jose, CA (US); Manoj Premanand Naik, San Jose, CA (US); Manosiz Bhattacharyya, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 57 days.

(21) Appl. No.: 17/743,117

(22) Filed: May 12, 2022

(65) Prior Publication Data

US 2023/0315338 A1    Oct. 5, 2023

(30) Foreign Application Priority Data

Mar. 31, 2022    (IN) .............................. 202241019542

(51) Int. Cl.
*G06F 3/06*    (2006.01)
(52) U.S. Cl.
CPC .......... *G06F 3/0659* (2013.01); *G06F 3/0604* (2013.01); *G06F 3/0643* (2013.01); *G06F 3/067* (2013.01)
(58) Field of Classification Search
CPC .... G06F 3/0659; G06F 3/0604; G06F 3/0643; G06F 3/067
See application file for complete search history.

(56) References Cited

U.S. PATENT DOCUMENTS

| 7,680,835 B2 * | 3/2010 | MacLaurin ............. G06F 16/10 |
| | | 709/248 |
| 8,549,518 B1 | 10/2013 | Aron et al. |
| 8,601,473 B1 | 12/2013 | Aron et al. |
| | | (Continued) |

OTHER PUBLICATIONS

Cano, Ignacio, "Curator: Self-Managing Storage for Enterprise Clusters" University of Washington; published Mar. 2017; pp. all.
(Continued)

*Primary Examiner* — Michael A Keller
(74) *Attorney, Agent, or Firm* — Cesari and McKenna, LLP

(57) ABSTRACT

A unified namespace technique provides coherent access to unstructured data across different data access protocols having different logical constructs that are stored and managed on a storage system. A control plane infrastructure operates in connection with storage services to provide support for a vast array of storage platforms including file servers of a file system and object storage servers of an object store. Metadata associated with a data access transaction is processed separately and natively by a protocol stack of a particular storage service according to a particular data access protocol. The processed metadata is stored native to the access protocol in a metadata store associated with the particular storage service and is made available to the protocol stacks of the other storage services. Processed metadata is made available to the protocol stacks via an event notification logging service implemented as a message bus. A single canonical instance of the data is maintained for all of the logical constructs served by the storage system.

26 Claims, 3 Drawing Sheets

(56) References Cited

U.S. PATENT DOCUMENTS

| | | | |
|---|---|---|---|
| 8,850,130 B1 | 9/2014 | Aron et al. | |
| 8,863,124 B1 | 10/2014 | Aron et al. | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 2011/0145363 A1* | 6/2011 | Ananthanarayanan | G06F 16/172 |
| | | | 709/218 |
| 2013/0013649 A1* | 1/2013 | El Husseini | G06Q 10/10 |
| | | | 707/804 |
| 2020/0272577 A1* | 8/2020 | Zeng | G06F 12/1018 |
| 2023/0229316 A1* | 7/2023 | Flag | G06F 12/0238 |
| | | | 711/162 |

OTHER PUBLICATIONS

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible" from https://nutanixbible.com/ Sep. 2020, pp. all.

Citrix XenDesktop 7.1 on Microsoft Hyper-V Server 2012 R2 on Nutanix Virtual Computing Platform Solution Design Citrix Validated Solutions, Jun. 25, 2014, 95 pages.

\* cited by examiner

UNIFIED NAMESPACE ACROSS DATA ACCESS PROTOCOLS

CROSS-REFERENCE TO RELATED APPLICATIONS

The present application claims the benefit of India Provisional Patent Application Serial No. 202241019542, which was filed on Mar. 31, 2022, by Dheer Moghe, et al. for UNIFIED NAMESPACE ACROSS DATA ACCESS PROTOCOLS, which is hereby incorporated by reference.

BACKGROUND

Technical Field

The present disclosure relates to namespaces of storage systems and, more specifically, to a unified namespace across data access/storage protocols used to access logical constructs served by a storage system.

Background Information

Current multi-protocol storage solutions provide storage and management of unstructured data as logical constructs, such as files or objects, which are usually served to user applications (users) via various well-known data access protocols, such as network file system (NFS), server message block (SMB), simple storage service (S3), etc. Although the data (shared data) may be stored and managed on a single platform (storage system), access to the data may be restricted or constrained across the protocols because native semantics of each of the protocols (e.g., interpretation of metadata associated with the data and operations/features related to data access) differ and may be incompatible. For example, operations related to access and permissions that are performed on files using NFS/SMB (file access protocols) are generally not the same as those operations that are performed on objects using S3 (object access protocols), such as overwrite of data when using file access protocols versus new version creation typical on "overwrite" of data using object access protocols. Accordingly, the current solutions typically employ "on-the-fly" filtering/mapping of data access requests within protocol stacks or provide protocol gateways to access the shared data. These solutions also compromise on native features provided by the access protocols because a lowest common denominator of semantically compatible features must be used across all the protocols to ensure comparably equal access to the data. In addition, applications are often biased towards a particular access protocol to take advantage of specific desired features; nevertheless, access to the unstructured data via other protocols, even if features are reduced, remains desirable. Thus, it is difficult to provide a single unified storage solution that allows native access to shared data using any of native data access protocols.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
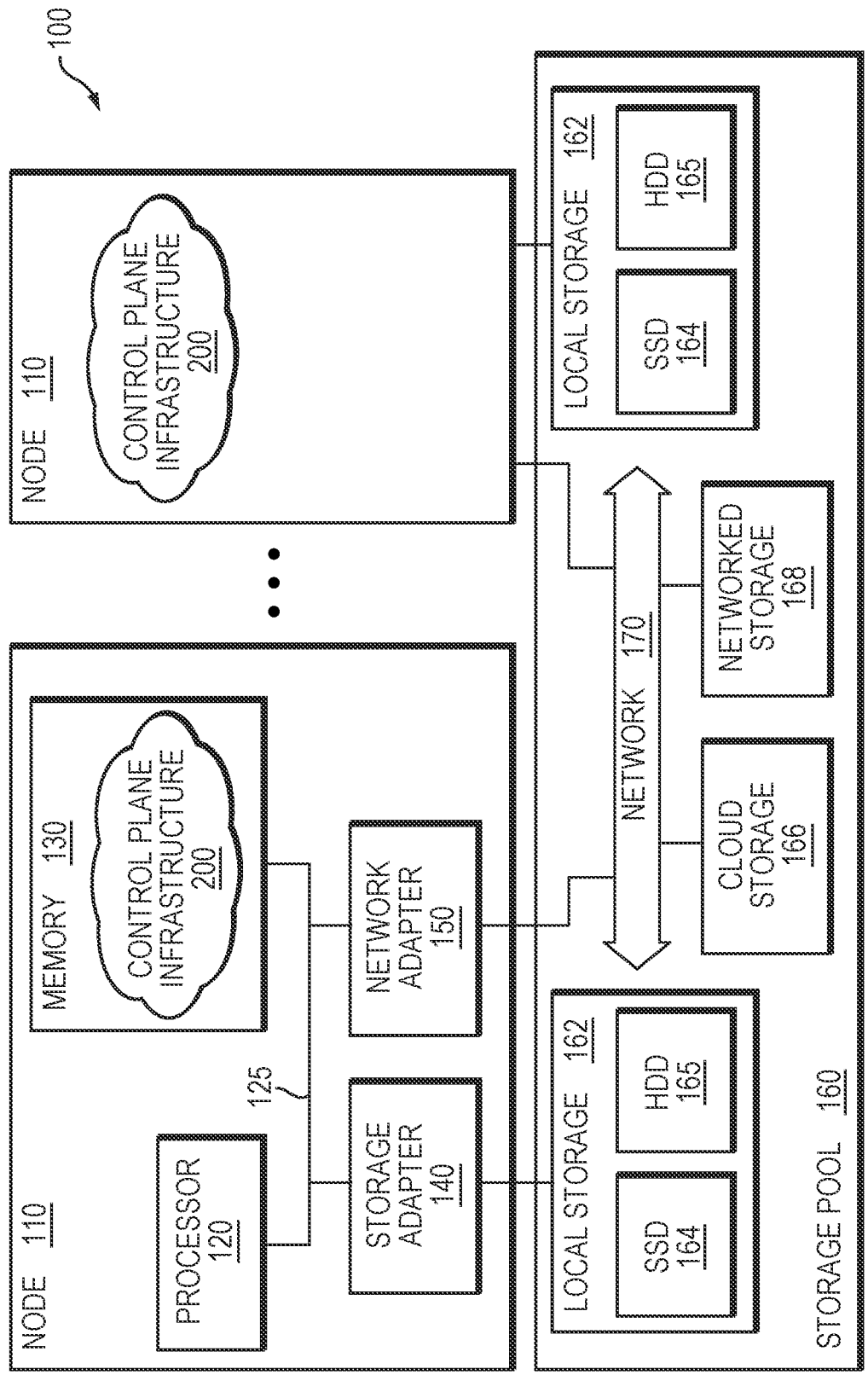
FIG. 1 is a block diagram of a plurality of interconnected nodes of a storage system.

The embodiments described herein are directed to a unified namespace technique configured to provide coherent access to unstructured data across different data access protocols (e.g., NFS, SMB, S3, etc.) having different logical constructs (e.g., files, objects, blocks, etc.) that are stored and managed on a storage system. A control plane infrastructure operates in connection with storage services (e.g., a files service and an objects service) to provide support for a vast array of storage platforms including file servers of a file system and object storage servers of an object store. The storage services interoperate with the different data access protocols which may remain unmodified so that, e.g., cloud provider-based storage may also be used. Metadata associated with a data access request (transaction) is processed separately and natively by a protocol stack of a particular storage service according to a particular data access protocol. The processed metadata is stored native to the access protocol in a metadata store associated with the particular storage service and is made available to the protocol stacks of the other storage services. This separate access model for the protocols enables creation and/or update of native metadata associated with the referenced logical construct of the transaction by other data access protocols, which store the updated metadata locally in metadata stores associated with their storage services. Semantically equivalent native metadata is thus maintained separately for each protocol stack associated with the logical construct, which may be accessed via all native protocol features when the transaction occurs from that protocol stack and/or when the metadata translation/processing is semantically compatible.

In an embodiment, the processed metadata is made available to the protocol stacks via an event notification logging (registry) system implemented as a message bus. Metadata involving changes to a logical construct (e.g., create, update, delete, rename operations) that are processed by a protocol stack of a storage service in response to data access transactions are registered as "namespace change" events and retrieved by the protocol stacks of the other storage services using the message bus of the control plane infrastructure. Notification events may be delivered using either a push or pull mechanism. According to the technique, the namespace change events exchanged between a source protocol stack (producer) and a target protocol stack (consumer) involves a delay (e.g., a "cooling-off" period for request activity typical of applications) where semantically equivalent storage service operations are coalesced to ensure that changes to the logical construct at the producer are complete. The cooling-off period and coalescing of multiple storage service operations into a single operation ensures that the metadata is eventually consistent (i.e., change events are semantically processed for other protocol stacks) at the protocol stacks of the storage services to enable unified namespace visibility of the changes via the other protocols.

In an embodiment, the technique provides a single canonical instance of the data (i.e., a common data store) for all of the logical constructs served by the storage system. Storage of data in a common data store (sole storage repository) obviates the need for replication or synchronization of the data between different storage repositories for protocol access purposes. That is, although there is a separate metadata store for each protocol stack of each storage service, the actual data blocks associated with the logical constructs are stored in a common data store to enable native access by all of the protocols to the data at a location on a physical storage device without compromise. For example, a directory creation operation for a logical files service construct may be performed using the respective protocol even though there is no native operation for an objects service construct (i.e., one or more set of native operations are performed to generate a semantically equivalent operation).

Advantageously, the control plane infrastructure of the unified namespace technique supports access to unstructured data across different logical constructs (e.g., file, object, block, "blob") while fully supporting native protocol features when accessing the data with a same protocol as well as semantically equivalent features (when supported) for accessing the data via other protocols. The technique allows the protocol stacks to remain unmodified and, thus, may be provided by third parties such as cloud storage services (e.g., Amazon S3, Azure blob service, Google object storage). The native protocol features of the protocol stacks are maintained across protocols for semantically compatible transactions, while semantically incompatible transactions cross-protocol are fully supported when access is wholly via the specific protocol, as all transaction metadata is natively maintained. In this manner, application biased protocols with unique or specific features are fully supported with any semantically compatible transactions via other protocols also being fully supported. Moreover, the technique requires only a single canonical instance of the data (with support for data replication and redundancy for data integrity purposes) yet maintains multiple metadata instances according to each protocol stack native metadata storage and maintenance/update practice.

DESCRIPTION

FIG. 1 is a block diagram of a plurality of nodes 110 interconnected as a storage system 100 and configured to provide compute and storage services for information, i.e., data and metadata, stored on storage devices. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid-state drives (SSDs) 164 and magnetic hard disk drives (HDDs) 165, which are organized as local storage 162 and virtualized within multiple tiers of storage as a storage pool 160, referred to as scale-out converged storage (SOCS). To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the storage system 100 over network 170, which is illustratively an Ethernet local area network (LAN). The network adapter 150 may thus be embodied as a network interface card having the mechanical, electrical and signaling circuitry needed to connect the node 110 to the network 170. The multiple tiers of SOCS include storage that is accessible through the network 170, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network 170 may be effected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS), as well as specialized application program interfaces (APIs) may also be advantageously employed.

The main memory 120 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software that provides a virtualization system (such as, e.g., a file system and object store), and manipulate the data structures. As described herein, the virtualization system also provides a control plane infrastructure 200 of a unified namespace technique that is configured to provide access to unstructured data shared across different data access protocols (e.g., NFS, SMB, S3, etc.) having different logical constructs (e.g., files, objects, blocks, etc.) that are stored and managed on the storage system 100.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
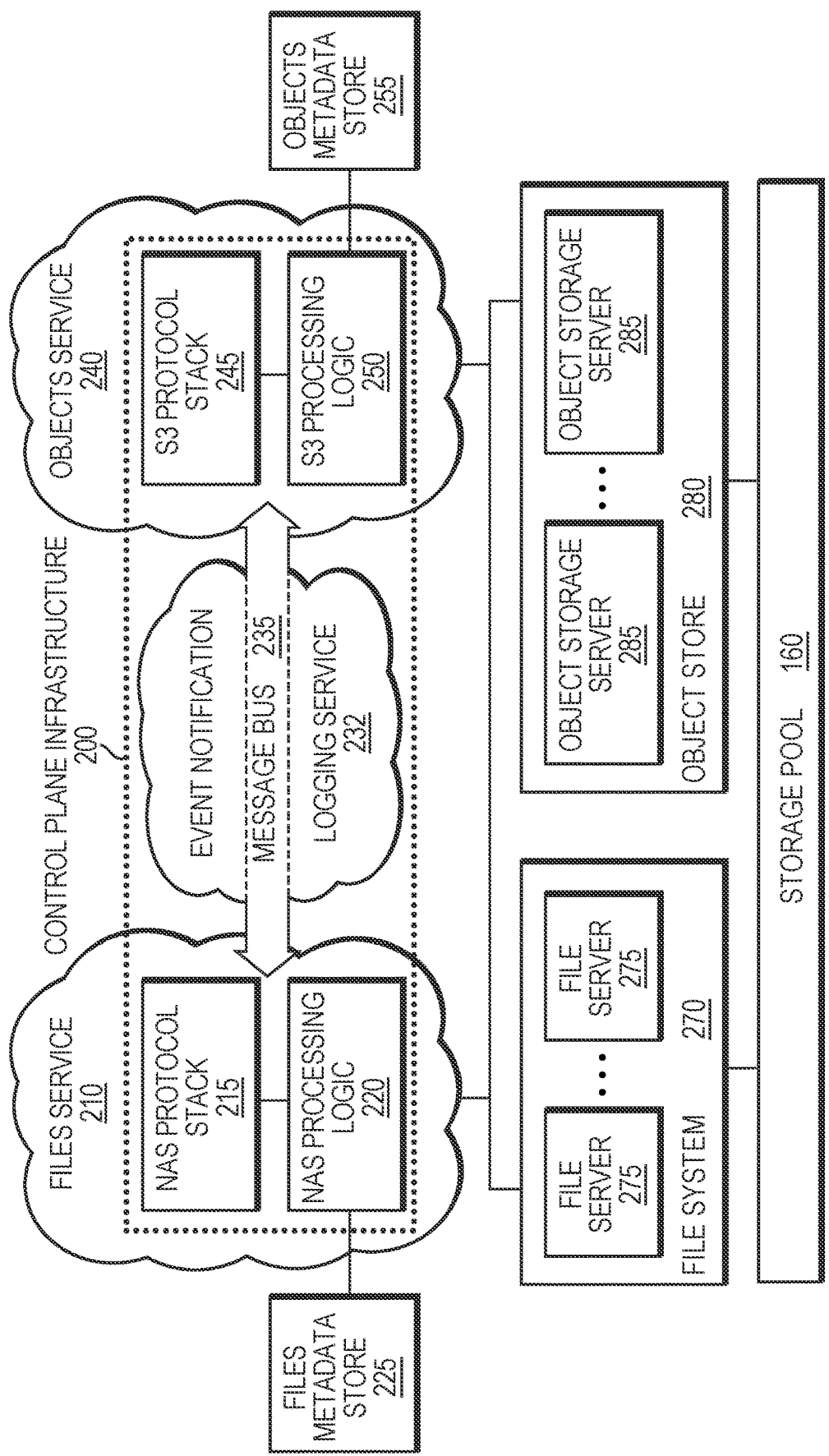
FIG. 2 is a block diagram of a control plane infrastructure of a unified namespace technique.

FIG. 2 is a block diagram of the control plane infrastructure of the unified namespace technique. The control plane infrastructure 200 operates in connection with storage services (e.g., a files service 210 and an objects service 240) to provide support for a vast array of storage platforms including file servers 275 of a file system 270 and object storage servers 285 of an object store 280 coupled to storage pool 160. In addition, the services 210, 240 interoperate with the different data access protocols which remain unmodified so that, e.g., cloud provider-based storage may also be used. The files service 210 includes a NFS/SMB (NAS) protocol stack 215 and NAS processing logic 220 that communicate over a message bus 235 to a S3 protocol service/stack 245 and S3 processing logic 250 of the objects service 240.

As described further herein, the NAS/S3 processing logic 220, 250 processes metadata changes pertaining to input/output (data access) requests for logical constructs (files/objects) received at a NAS/S3 "source" protocol stack 215, 245 and that occur within a predetermined period of time. The processed metadata changes are coalesced, stored in a respective files/objects metadata store 225, 255, and transferred over the message bus 235 for registration and event notification; the message bus 235 is thus organized as an event notification logging (registry) system 232. Illustratively, the coalesced metadata changes are registered as an event and a respective S3/NAS "target" protocol stack 245, 215 is notified of the event. In response, the target protocol stack 245, 215 retrieves the metadata changes and processes them (using the respective S3/NAS processing logic 250, 220) to semantics that are native to that protocol. The file servers 275 and object storage servers 285 are configured to store the data associated with the transactions as logical constructs (files/objects) within containers (shares/buckets) of their respective data stores (file system 270/object store 280) formed from the storage pool 160.

In accordance with the technique, metadata associated with a data access request (transaction) is processed and/or translated separately and natively by each NAS/S3 protocol stack 215, 245 of a respective files/objects service 210, 240 according to a particular data access protocol. The processing/translation of metadata may involve numerous techniques, including, but not limited to, time windows based on heuristics or artificial intelligence (e.g., by application profile/pattern, dataset type, user pattern, etc.) for accumulating transactions that can be batched and/or coalesced (e.g., repeated idempotent events, self-canceling sets of events such as create/delete) at the NAS/S3 processing logic 220, 250. The processed metadata is stored locally in the files/objects metadata store 225, 255 associated with the respective service 210, 240 and is made available to the protocol stack 245, 215 of the other service 240, 210. This separate access model for the protocols enables creation and/or update of native metadata associated with the referenced logical construct of the transaction by each data access protocol, which stores the updated metadata locally in a metadata store 225, 255 associated with its storage service.

In an embodiment, the processed metadata transactions are pushed as events (i.e., "produced") onto the message bus 235 and logged (e.g., on stable storage of the event notification logging system 232) to essentially share the transactions with the target protocol stack. The processing logic/code associated with the target protocol stack "consumes" (processes/filters) the metadata events by translating them into native metadata associated with the relevant logical construct. Notably, the message bus 235 provides a consumer/producer model with a source protocol stack (producer) "pushing" events and a target protocol stack (consumer) "pulling" the events upon notification. In an alternate embodiment, the producer may "post" (but not push) the events, which the consumer may then asynchronously pull upon notification. The processed/coalesced metadata transactions are fully logged at the message bus 235 and re-playable in response to a crash with each event being universally and sequentially identified to avoid inconsistency from re-applying non-idempotent events.

Illustratively, the message bus 235 is embodied as a persistent communication channel/medium between the storage services 210, 240. The storage services 210, 240 register with message bus 235 for notifications of metadata changes. The NAS/S3 processing logic 220, 250 of the storage services convert those changes to their native metadata semantics to maintain metadata consistency between the services. According to the technique, the message bus 235 is configured to provide a robust and reliable event notification system of metadata changes without disturbing the native protocol stack of each service. The message bus 235 allows the files service 210 and objects service 240 to run natively in the cloud or on-premises using custom APIs provided by the services. The message bus 235 supports replay operations of events while ensuring the order of notification events is always maintained.

Moreover, the message bus 235 enables metadata namespace changes that occur at one protocol stack to become eventually consistent and visible at the other protocol stack. For example, file system or object store events are registered for corresponding object store or file system operations, such as create, write (update) and delete operations, respectively. The producer/consumer model enables logging of all events (as generated) by a source protocol stack (producer) with the message bus 235 so that a target protocol stack (consumer) may access (retrieve) the events using, e.g., event application programming interface (API) calls with an index and count. Illustratively, partner servers (e.g., processing logic 220, 250) of the storage services 210, 240 register and "listen" for the occurrence of notification events. Using the event APIs, the processing logic can fetch the events (e.g., a sequence of writes coalesced as a single event) as they are generated to provide visibility of the metadata changes at the protocol stack and update of the namespace of each storage service.

In an embodiment, the notification events posted to/pulled from the message bus 235 assume a form that is well-defined but not specific to the manner of access (protocol); instead, a generic representation is provided having sufficient information for translation into equivalent form native to each access protocol. For example, an SMB/NFS/S3 native create/write of a file/object may translate into a generic CREATE/WRITE event that includes all the attributes that are relevant/known to that native protocol stack. The consumer may then (semantically) interpret (translate/filter) the payload of the event and consume the information therein in a target native form. This allows use of the message bus 235 for other implementations, such as replication or auditing. In addition, the notification events may be posted to/pulled from the message bus 235 out-of-order with appropriate ordering rules applied at inbound processing logic/code to order events where semantically necessary according to the protocol. In this manner, no synchronization is needed on the message bus 235 itself which can remain free flowing across computing nodes, e.g., of the storage system 100. Furthermore, each protocol stack 215, 245 may be local or remote, so that the message bus 235 exists as a virtual structure shared among different locations that provide execution of each protocol stack.

Illustratively, transactions are processed by the processing logic 220, 250 of each storage service as they occur (bi-directionally and statically) into each respective local metadata store 225, 255. The processed transactions are stored as metadata "at-rest" with native semantics in the metadata store, which obviates the need for access-based conversion. However, the technique provides semantics for cross-protocol access. For example, file system semantics that create hard links and renames are converted and/or translated to object store semantics. Similarly, object store semantics that create versions of objects require conversion and/or translation to file system semantics. Note that in some situations, there may be compromises for operations/features of logical constructs, such as access control list changes, that have no equivalence among the protocols.

In an embodiment, the transactions are coalesced (combined) by the processing logic 220, 250, wherein files service operations that, e.g., create, write and rename a file in the files service namespace may manifest (show-up) as a single operation that is made eventually consistent in the objects service namespace. Here, semantically equivalent operations (e.g., multiple write operations even if not sequential and canceling operations, such as create/delete of temporary files) are processed during a "cooling-off" period of request activity typical of applications and combined as a notification event to the other protocol. Heuristic adaptive methods that adjust to and predict application request patterns (i.e., pattern of change events) may be applied to minimize the number of events (messages) transferred over the message bus 235 and needed for processing by the processing logic of the target storage service. Thus, semantically equivalent native metadata is maintained separately for each protocol stack associated with the logical construct, which may be accessed via native protocol features when the transaction originates from that protocol stack and/or from other protocol stacks when the metadata translation/processing is semantically compatible.

Metadata involving changes to a logical construct (e.g., create, update, delete operations) that are processed by the NAS/S3 (source) protocol stack 215, 245 of files/objects service 210, 240 in response to transactions are registered as "namespace change" events and retrieved by the S3/NAS (target) protocol stack 245, 215 of the object/files service 240, 210 using the message bus 235 of the control plane infrastructure 230. According to the technique, the namespace change events exchanged between a source protocol stack (producer) and a target protocol stack (consumer) involves a time delay (e.g., the cooling-off period) where semantically equivalent storage service operations may be coalesced (i.e., reduced events/changes) while ensuring that changes to the logical construct at the producer are complete. Such temporal latency is acceptable because, e.g., the files service 210 may perform various operations (e.g., create file, write/append to the file, update the file) over a period of time associated with file creation. This period of time (the cooling-off period) is needed to ensure operations (e.g., writing) to the file are complete and reflects a period of reduced activity (e.g., quiescence of events/requests) with respect to the objects service 240. As a result, the cooling-off period and coalescing of multiple storage service operations into a single operation ensures that the metadata is eventually consistent (i.e., change events are semantically processed for other protocol stacks) at the protocol stacks of the storage services to enable unified namespace visibility of the changes via the other protocols.

Figure 3:
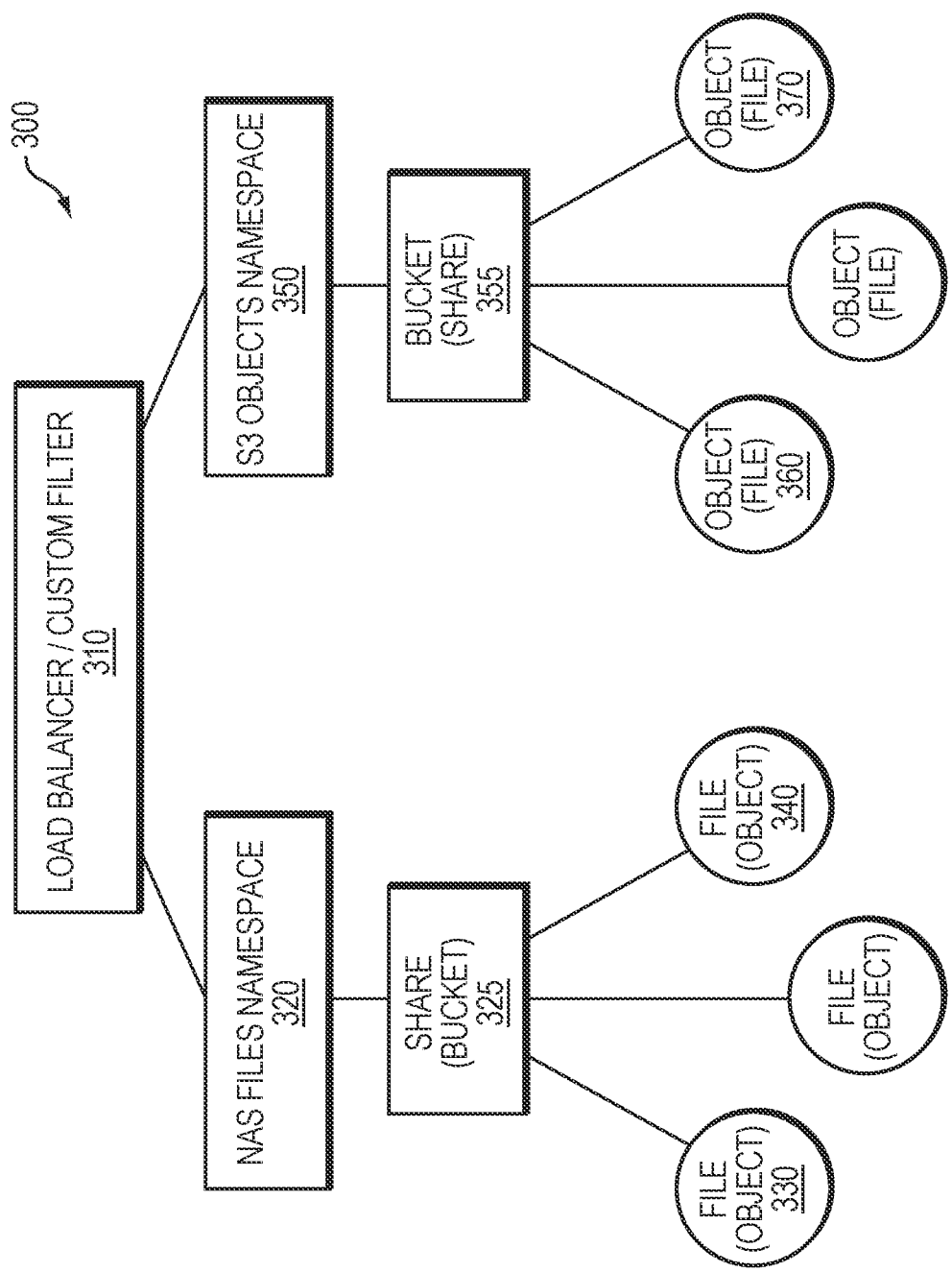
FIG. 3 is a block diagram of a unified namespace of the unified namespace technique.

In an embodiment, native access to data using all operations of a particular protocol is supported, e.g., directories can be created using the NFS/SMB (i.e., "NAS") protocol, but such operations may not be supported using S3 protocol. To that end, the unified namespace technique is configured to ensure that processed metadata changes that occur at one protocol are eventually visible and consistent, e.g., on the namespace of the other protocol. FIG. 3 is a block diagram of the unified namespace 300. Assume a file 330 is created within share 325 of the NAS files namespace 320 using the NAS protocol. The data of the file 330 is eventually visible and accessible as an object 360 within a bucket 355 of the S3 objects namespace 350 using the S3 protocol. That is, visibility of the created file 330 is not instantaneously available as an object 360 in the S3 objects namespace 350 but is available after a period of time. Once the cooling-off period (a configurable period of, e.g., 30 seconds, which may be predefined or dynamic and determined heuristically) expires, the file 330 becomes visible as an object 360 in the S3 objects namespace 350. Similarly, if an object 370 is created in the S3 objects namespace at the objects service 240 using the S3 protocol, the data of the object 370 will eventually be visible as a file 340 in the NAS files namespace 320.

According to the technique, universal naming, e.g., a cross-entity-type (file/object) unified namespace 300, may be maintained using metadata to store name and appropriate identifier information propagated by the message bus 235. In this manner, access to an entity may be achieved from any protocol regardless of native access identification (e.g., filenames for NAS, keys for objects). Further, any number of future data access protocols can be supported as they emerge by simply writing a message bus "driver." To support improved efficiency for semantically divergent transactions and access methods among the protocol stacks, metadata specific to some protocol stacks may be maintained, such as ordered lists of identifiers/names to object keys (e.g., for S3 protocol stack) to support rapid metadata processing of filename-oriented events posted on the message bus (e.g., rename a file). Other file-oriented events, such as directory operations, may require provisioning and maintenance of other data structures for non-file-oriented storage protocols.

In an embodiment, an intermediate redirection mechanism embodied as a load balancer with custom filter 310 may be employed to provide the unified namespace 300 to users by redirecting data access requests/transactions to the respective NAS/S3 namespace 320, 350 exported by the respective NAS/S3 protocol stack 215, 245 of the respective files/objects service 210, 240. Data access may be performed using file path names (names) that link a file name/object identifier (ID) to each respective file/object. In addition, APIs for each protocol stack may be provided for namespace conversion. For example, a name of a file may be provided (e.g., via a namespace API of the objects service 240) for a data access request using the S3 protocol associated with an access key of an object, whereas the access key of the object may be provided (e.g., via a namespace API of the files service) for a data access request using a NAS protocol associated with the name of the file. The objects service 240 may maintain the ordered list of names to object IDs, i.e., objects are indexed by object IDs with corresponding file paths to files in the files service 210. In response to a rename (metadata change) operation, the objects service 240 may update the listing of corresponding object IDs to reflect the changed name of the file.

In another embodiment, an event (transaction) that updates an entity (file or object) may include one of the following transaction details:

1. Reference the entity with an identifier that is guaranteed to be unique within the container (share/bucket). For newly created entities, associated with each entity are attributes, e.g., a name, associated file/object attributes and other metadata, and a "link" to a parent in the case of creation in a namespace that has a hierarchy (SMB/NFS). For modifications to existing entities, the identifier is sufficient to reference the entity. This is similar to how "file system" operations are processed in a typical POSIX system. The consumer then translates the information contained in the transactions to construct a namespace (e.g., key).
2. Reference each entity with an identifier and a "canonical" name (e.g., fully qualified absolute path relative to the "top" of the container name). Here, no link to a parent in the hierarchy is needed as it is already included in the name. For example, this occurs in cases where the (creation of) intermediate namespace entries (e.g., directories) are not explicitly included in transactions.

In an embodiment, the unified namespace technique provides a single canonical instance of the data (i.e., a common data store) for all of the logical constructs served by the storage system 100. Storage of data in a common data store (sole storage repository) obviates the need for replication or synchronization of the data between different storage repositories for protocol access purposes. That is, although there is a separate metadata store 225, 255 for each NAS/S3 protocol stack 215, 245 of each files/objects service 210, 240, the actual data blocks associated with the logical constructs are stored in a common data store to facilitate native access by all of the protocols to the data at a location on a physical storage device. For example, a directory creation operation for a logical files service construct may be performed using the respective protocol even though there is no equivalent operation for an objects service construct.

Illustratively, the NAS/S3 protocols access the same locations on physical storage devices at which the data of the logical constructs (files/objects) reside. According to the technique, the files service 210 and objects service 240 utilize common storage APIs to perform data write operations of their respective protocols. That is, data write operations to the logical constructs (entities) occur natively to a single data store repository, e.g., one or more containers of file system 270/object store 280 formed from the same physical (or virtual) storage locations on the storage devices of the storage pool 160. The entities may be grouped by virtual storage container (e.g., vdisk) separate from the underlying repository. For example, the data of write operations for entities directed to cloud storage (using S3) may be stored in a container, such as a bucket of the object store 280, whereas the write data for the entities directed to NAS storage (using NFS/SMB) may be stored in another container, such as a share of the file system 270. A storage API may be issued to write data to a location on the data store repository, which eliminates the need for copies of data between the protocol stacks. Appropriate metadata is provided to maintain association of an entity to a container, e.g., file/share and object/bucket. The message bus 235 is used to maintain information to support all manner of access types/transactions. Each protocol stack thus natively writes its metadata to its local metadata store but writes the data of its logical construct to a common (virtual/physical) data store.

Advantageously, the control plane infrastructure of the unified namespace technique supports access to unstructured data across different logical construct entities (e.g., file, object, block, "blob") while fully supporting native protocol features when accessing the data with a same protocol as well as semantically equivalent features (when supported) for accessing the data via other protocols. The technique also allows the protocol stacks to remain unmodified and, thus, may be provided by third parties such as cloud storage services (e.g., Amazon S3, Azure blob service, Google object storage). The native protocol features of the protocol stacks are maintained across protocols for semantically compatible transactions, while semantically incompatible transactions cross-protocol are fully supported when access is wholly via the specific protocol as all transaction metadata is natively maintained. In this manner, application biased protocols with unique or specific features are fully supported with any semantically compatible transactions via other protocols also being fully supported. That is, meaningful cross-protocol support of various access features (such as ACLs, versioning, read-only, snapshots/clones, etc.) is provided where compatible/appropriate. Moreover, the technique requires only a single canonical instance of the data (with support for data replication and redundancy for data integrity purposes) yet maintains multiple metadata instances according to each protocol stack native metadata storage and maintenance/update practice.

The foregoing description has been directed to specific embodiments. It will be apparent however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on a processor of a storage system, the program instructions configured to:
    process metadata changes pertaining to one or more data access requests for a logical construct received at a source protocol stack of a first storage service executing on the storage system, the metadata changes processed according to first semantics native to a first data access protocol and persistently stored at the first storage service;
    coalesce the metadata changes for transfer over a message bus connecting the first storage service to a second storage service executing on the storage system, wherein data associated with the access requests is stored within a container of a data store common to the storage services;
    notify a target protocol stack of the second storage service of the coalesced metadata changes as an event; and
    translate the coalesced metadata changes according to second semantics of a second data access protocol of the target protocol stack such that access to data of the logical construct is semantically equivalent to access to the data via the source protocol stack.

2. The non-transitory computer readable medium of claim 1, wherein the translated coalesced metadata changes are stored at the second storage service and associated with the logical construct without replication of the data.

3. The non-transitory computer readable medium of claim 1, wherein the coalesced metadata changes pertain to data access request changes that occur according to a heuristically determined period of time based on access pattern.

4. The non-transitory computer readable medium of claim 1, wherein the data store is one of a file system or an object store.

5. The non-transitory computer readable medium of claim 1, wherein the message bus is organized as an event notification logging system supporting recovery and replay in response to a failure.

6. The non-transitory computer readable medium of claim 1, wherein the coalesced metadata changes are logged at the message bus and are re-playable upon a crash with the event being universally and sequentially identified to avoid inconsistency from re-applying non-idempotent events.

7. The non-transitory computer readable medium of claim 1, wherein the program instructions configured to notify the target protocol stack of the coalesced metadata changes are driven by the source protocol stack as a push of the event to the message bus.

8. The non-transitory computer readable medium of claim 1, wherein the program instructions configured to notify the target protocol stack of the coalesced metadata changes are further configured to enable the source protocol stack to post the event to the message bus for notification.

9. The non-transitory computer readable medium of claim 1, wherein the program instructions configured to notify the target protocol stack of the coalesced metadata changes are further configured to enable the target protocol stack to pull the event from the message bus upon notification.

10. The non-transitory computer readable medium of claim 1, wherein the first data access protocol is one of a network attached storage (NAS) protocol or simple storage service (S3) protocol and wherein the second data access protocol is a remaining one of the S3 or NAS protocol.

11. A method comprising:
processing metadata changes pertaining to one or more data access requests for a logical construct received at a source protocol stack of a first storage service executing on the storage system, the metadata changes processed according to first semantics native to a first data access protocol and persistently stored at the first storage service;
coalescing the metadata changes for transfer over a message bus connecting the first storage service to a second storage service executing on the storage system, wherein data associated with the access requests is stored within a container of a data store common to the storage services;
notifying a target protocol stack of the second storage service of the coalesced metadata changes as an event; and
translating the coalesced metadata changes according to second semantics of a second data access protocol of the target protocol stack such that access to data of the logical construct is semantically equivalent to access to the data via the source protocol stack.

12. The method of claim 11, wherein the translated coalesced metadata changes are stored at the second storage service and associated with the logical construct without replication of the data.

13. The method of claim 11, wherein the data store is one of a file system or object store.

14. The method of claim 11, further comprising organizing the message bus as an event notification logging system supporting recovery and replay in response to a failure.

15. The method of claim 11, wherein the coalesced metadata changes are logged at the message bus and re-playable in response to a crash with the event being universally and sequentially identified to avoid inconsistency from re-applying non-idempotent event.

16. The method of claim 11, wherein notifying the target protocol stack of the coalesced metadata changes further comprises enabling the target protocol stack to pull the event from the message bus upon notification.

17. The method of claim 11, wherein the first data access protocol is one of a network attached storage (NAS) protocol or simple storage service (S3) protocol and wherein the second data access protocol is a remaining one of the S3 or NAS protocol.

18. An apparatus comprising:
a first storage system having program instructions executing a first storage service configured to,
process metadata changes pertaining to one or more data access requests for a logical construct at a source protocol stack of the first storage service, the metadata changes processed according to first semantics native to a first data access protocol and persistently stored at the first storage service;
coalesce the metadata changes for transfer as an event over a message bus connecting the first storage service to a second storage service, wherein data associated with the access requests is stored within a container of a data store common to the storage services; and
a second storage system having program instructions executing the second storage service configured to,
receive from the first storage service a notification at a target protocol stack of the second storage service of the coalesced metadata changes as the event; and
translate the coalesced metadata changes according to second semantics of a second data access protocol of the target protocol stack such that access to data of the logical construct is semantically equivalent to access to the data via the source protocol stack.

19. The apparatus of claim 18, wherein the program instructions for the second storage service are further configured to store the translated coalesced metadata changes at the second storage service and associated with the logical construct without replication of the data.

20. The apparatus of claim 18, wherein the data store is one of a file system or object store.

21. The apparatus of claim 18, wherein the message bus is organized as an event notification logging system supporting recovery and replay in response to a failure.

22. The apparatus of claim 18, wherein the message bus is further organized to,
log the coalesced metadata and
re-play the coalesced metadata changes in response to a crash with the event being universally and sequentially identified to avoid inconsistency from re-applying non-idempotent event.

23. The apparatus of claim 18, wherein the notification of the coalesced metadata changes is driven by the source protocol stack as a push of the event to the message bus.

24. The apparatus of claim 18, wherein the notification of the coalesced metadata changes is driven by the source protocol stack as a post of the event to the message bus.

25. The apparatus of claim 18, wherein the notification of the coalesced metadata changes is received at the target protocol stack as a pull of the event from the message bus.

26. The apparatus of claim 18, wherein the first data access protocol is one of a network attached storage (NAS) protocol or simple storage service (S3) protocol and wherein the second data access protocol is a remaining one of the S3 or NAS protocol.

* * * * *